US009787471B1

(12) United States Patent
Gesley et al.

(10) Patent No.: US 9,787,471 B1
(45) Date of Patent: Oct. 10, 2017

(54) DATA ENCIPHERING OR DECIPHERING USING A HIERARCHICAL ASSIGNMENT SYSTEM

(75) Inventors: Mark Gesley, Oakland, CA (US); Richard Crandall, Portland, OR (US); Edlyn Teske, Toronto (CA); Tim Williams, Danville, CA (US)

(73) Assignee: Robert T. Jenkins and Virginia T. Jenkins, Sacramento, CA (US), as Trustees for the Jenkins Family Trust dated February 8, 2002.

( * ) Notice: Subject to any disclaimer, the term of this patent is extended or adjusted under 35 U.S.C. 154(b) by 1177 days.

(21) Appl. No.: 11/446,452

(22) Filed: Jun. 1, 2006

Related U.S. Application Data

(60) Provisional application No. 60/687,266, filed on Jun. 2, 2005.

(51) Int. Cl.
  *G06F 21/00* (2013.01)
  *H04L 9/08* (2006.01)
  *H04L 7/04* (2006.01)

(52) U.S. Cl.
  CPC . *H04L 9/08* (2013.01); *H04L 7/04* (2013.01)

(58) Field of Classification Search
  CPC ......... H04L 7/041; H04L 7/04; H04L 1/0041; H04L 63/08; H04L 63/0807; H04L 63/083; H04L 63/0838; H04L 63/0846; H04L 63/0853; H04L 63/0861; H04L 63/0869; H04L 63/0876; H04L 63/0884; H04L 63/0892; H04L 9/3202; H04L 9/3205; H04L 9/3507; H04L 9/321; H04L 9/3213; H04L 9/3215; H04L 9/3218; H04L 9/3221; H04L 9/3223; H04L 9/3226; H04L 9/3228; H04L 9/3231; H04L 9/3234; H04L 9/3236; H04L 9/3239; H04L 9/3242; H04L 9/3244; H04L 9/3247; H04L 9/3249; H04L 9/3252; H04L 9/3255; H04L 9/3257; H04L 9/326; H04L 9/3263; H04L 9/3265; H04L 9/3268; H04L 9/3271; H04L 9/3273; Y10S 707/99942
  USPC ........... 341/143; 380/28, 240; 713/151, 168, 713/178
  See application file for complete search history.

(56) References Cited

U.S. PATENT DOCUMENTS

| | | | |
|---|---|---|---|
| 5,724,576 A | 3/1998 | Letourneau | |
| 5,758,152 A | 5/1998 | LeTourneau | |
| 5,787,432 A | 7/1998 | LeTourneau | |
| 6,049,613 A * | 4/2000 | Jakobsson | H04L 9/06 380/28 |
| 6,055,537 A * | 4/2000 | LeTourneau | G06F 9/44 |

(Continued)

OTHER PUBLICATIONS

Konyagin et al., "On primes recognizable in deterministic polynomial time" The mathematics of Paul Erdos, R. L. Graham and J. Nesetril, eds., Springer-Verlag, Berlin, 1997, pp. 176-198.*

(Continued)

*Primary Examiner* — William Goodchild
(74) *Attorney, Agent, or Firm* — Berkeley Law & Technology Group, LLP

(57) ABSTRACT

Embodiments of a data encryption and/or decryption technique are disclosed. Briefly, for example, in accordance with one example embodiment a method is provided. A message based at least in part on a hierarchical symbol assignment system is encrypted. The hierarchical symbol assignment system is represented as a numerical value.

93 Claims, 6 Drawing Sheets

(56) References Cited

U.S. PATENT DOCUMENTS

| | | | |
|---|---|---|---|
| 6,330,332 B1 * | 12/2001 | Itoh | G06F 7/72 380/1 |
| 6,516,064 B1 * | 2/2003 | Osawa | G11B 20/00137 380/201 |
| 6,529,929 B2 | 3/2003 | Hong | |
| 6,845,482 B2 | 1/2005 | Yao et al. | |
| 6,919,826 B1 * | 7/2005 | Peacock | H03M 7/40 341/107 |
| 7,711,666 B1 | 5/2010 | Crandall | |
| 2002/0006202 A1 * | 1/2002 | Fruehauf | H04L 9/12 380/260 |
| 2002/0136411 A1 * | 9/2002 | Ishiguro | G06F 21/10 380/278 |
| 2002/0159598 A1 * | 10/2002 | Rubinstein | H04L 9/12 380/259 |
| 2002/0178353 A1 * | 11/2002 | Graham | H04L 12/5875 713/151 |
| 2003/0016385 A1 * | 1/2003 | Matsumoto | H04L 63/10 358/1.15 |
| 2003/0065925 A1 * | 4/2003 | Shindo | G06F 21/10 713/178 |
| 2003/0076954 A1 * | 4/2003 | Vanstone | H04L 9/0841 380/28 |
| 2004/0047470 A1 * | 3/2004 | Candelore | H04N 5/783 380/240 |
| 2005/0018853 A1 * | 1/2005 | Lain | H04L 9/0836 380/277 |
| 2005/0156770 A1 * | 7/2005 | Melanson | H03M 7/3013 341/143 |
| 2006/0101524 A1 * | 5/2006 | Weber | 726/27 |
| 2006/0294136 A1 * | 12/2006 | Wu | G06F 9/4428 |
| 2007/0147603 A1 | 6/2007 | Nakano et al. | |

OTHER PUBLICATIONS

Request for Continued Examination filed Nov. 13, 2009 in U.S. Appl. No. 11/511,611, 3 pages.

Notice of Allowance and Examiner's Amendment mailed Dec. 22, 2009 in U.S. Appl. No. 11/511,611, 10 pages.

Continuation Patent Application filed Nov. 5, 2009 in U.S. Appl. No. 12/613,481, 31 pages.

Preliminary Amendment filed Jan. 13, 2010 in U.S. Appl. No. 12/613,481, 6 pages.

Response to Notice to File Missing Parts filed Jan. 19, 2010 in U.S. Appl. No. 12/613,481, 39 pages.

Crandall et al., "Prime Numbers: A Computational Perspective", Springer ISBN 0-387-94777-9, www.springer-ny.com, 2001, Part 1, pp. 1-263.

Crandall et al., "Prime Numbers: A Computational Perspective", Springer ISBN 0-387-94777-9, www.springer-ny.com, 2001, Part 2, pp. 264-end of book.

Non-final Office action mailed Sep. 30, 2008, in U.S. Appl. No. 11/511,611, 10 pages.

Response filed Dec. 30, 2008 in U.S. Appl. No. 11/511,611, 22 pages.

Final Office action mailed Mar. 17, 2009 in U.S. Appl. No. 11/511,611, 13 pages.

Amendment After Final filed May 22, 2009 in U.S. Appl. No. 11/511,611, 27 pages.

Advisory action mailed Jun. 15, 2009 in U.S. Appl. No. 11/511,611, 4 pages.

RCE and Amendment filed Jun. 17, 2009 in U.S. Appl. No. 11/511,611, 20 pages.

Examiner's Interview Summary mailed Jun. 27, 2009 in U.S. Appl. No. 11/511,611, 2 pages.

Notice of Allowance and Examiner's Amendment mailed Sep. 3, 2009 in U.S. Appl. No. 11/511,611, 10 pages.

U.S. Appl. No. 11/511,611 Application as filed on Aug. 28, 2006, 32 pages.

U.S. Appl. No. 11/511,611 Notice to File Missing Parts mailed on Sep. 9, 2006, 2 pages.

U.S. Appl. No. 11/511,611 Response to Notice to File Missing Parts as filed on Jan. 31, 2007, 13 pages.

U.S. Appl. No. 11/511,611 Filing Receipt mailed on Feb. 6, 2007, 3 pages.

U.S. Appl. No. 11/511,611 Bibliographic Data Sheet as filed on Sep. 10, 2009, 1 page.

U.S. Appl. No. 11/511,611 Request for Continued Examination as filed on Nov. 13, 2009, 9 pages.

U.S. Appl. No. 11/511,611 Notice of Allowance, mailed Dec. 22, 2009, 14 pages.

U.S. Appl. No. 11/511,611 Issue Fee Payment, mailed Mar, 3, 2010, 6 pages.

U.S. Appl. No. 11/511,611 Issue Notification, mailed Apr. 14, 2010, 1 page.

U.S. Appl. No. 12/613,481 Notice to File Missing Parts and Filing Receipt as mailed on Nov. 18, 2009, 5 pages.

U.S. Appl. No. 12/613,481 Filing Receipt as mailed on Jan. 22, 2010, 3 pages.

U.S. Appl. No. 12/613,481 Notice of Publication as mailed on May 6, 2010, 1 page.

U.S. Appl. No. 12/613,481 Non-Final Office Action as mailed Sep. 14, 2010, 17 pages.

U.S. Appl. No. 12/613,481 Non-Final Office Action Response as filed on Nov. 19, 2010, 24 pages.

U.S. Appl. No. 12/613,481 Terminal Disclaimer, mailed Mar. 3, 2011, 3 pages.

U.S. Appl. No. 12/613,481 Decision on Terminal Disclaimer, mailed Mar. 12, 2011, 1 page.

U.S. Appl. No. 12/613,481 Notice of Allowance and Examiner Interview as mailed on Mar. 17, 2011, 15 pages.

* cited by examiner 1 1 1 1 0 0 0 0 0 0 X

0 X 1 0 0 X 0 X 1 0 0 X 1 0 0 X 1 0 X

0 X 1 X 1 X 0 0 X 1 0 X 1 1 1 X 1 1 X 0 X 1 1 1 1 1 X 0

1 X 1 X 1 X 1 X 0 0 X 1 1 X

1 X 1 X

N = 5815694844868966148210745878316313892182930946714205877783836798535342297692798906631319651117041991409877135468167973402149666899412622225427676241860966316965754377828486 57774958572273

40 Prime Factors

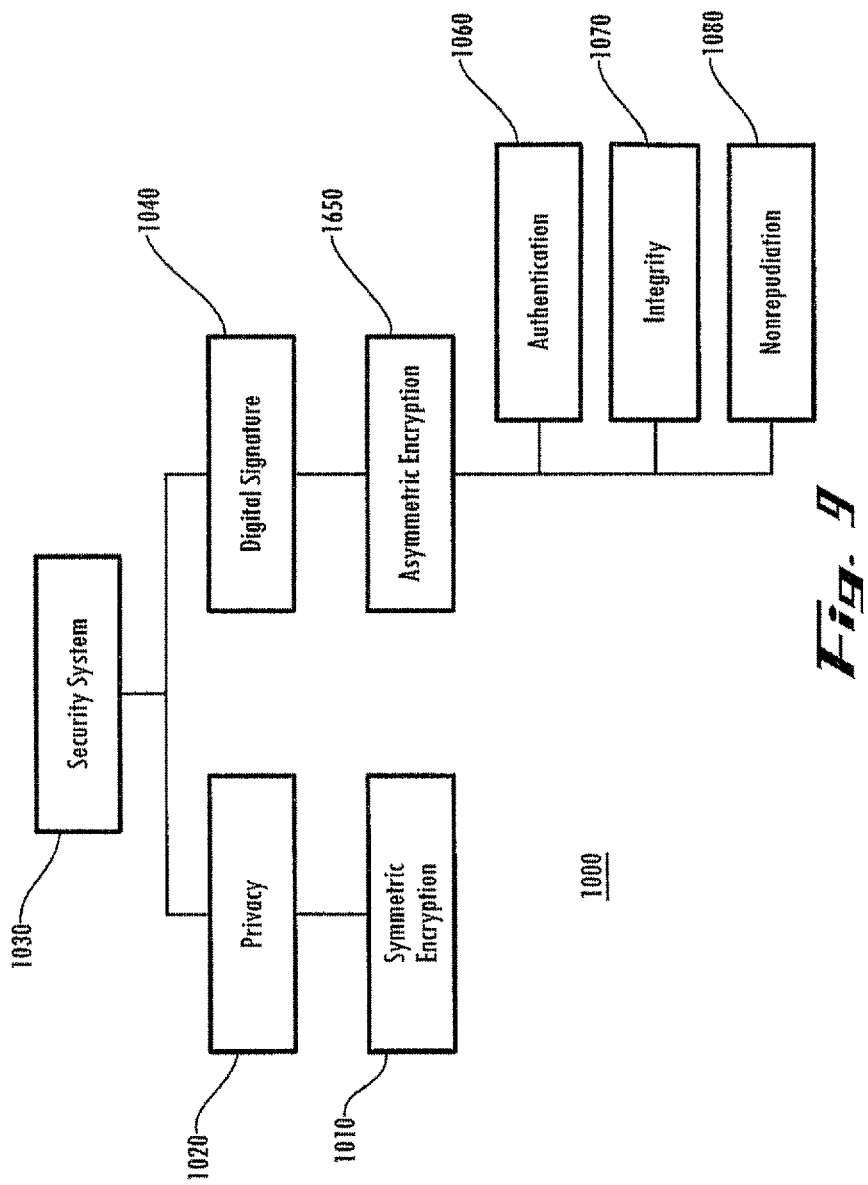

DATA ENCIPHERING OR DECIPHERING USING A HIERARCHICAL ASSIGNMENT SYSTEM

CROSS-REFERENCE TO RELATED APPLICATIONS

The present application is a nonprovisional application of U.S. provisional application No. 60/687,266, filed Jun. 2, 2005, entitled "DATA ENCRYPTION AND/OR DECRYPTION".

BACKGROUND

This disclosure is related to data encryption and/or decryption.

As is well-known, secure data encryption is an issue that pervades society. New and/or improved techniques for data encryption and/or decryption continue to be sought.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

FIG. 8 is a schematic diagram illustrating an embodiment a portion of a matrix or matrix-like representation for the embodiment portion of FIG. 5; and FIG. 9 is a schematic diagram of an embodiment of a security system.

DETAILED DESCRIPTION

Figure 1:
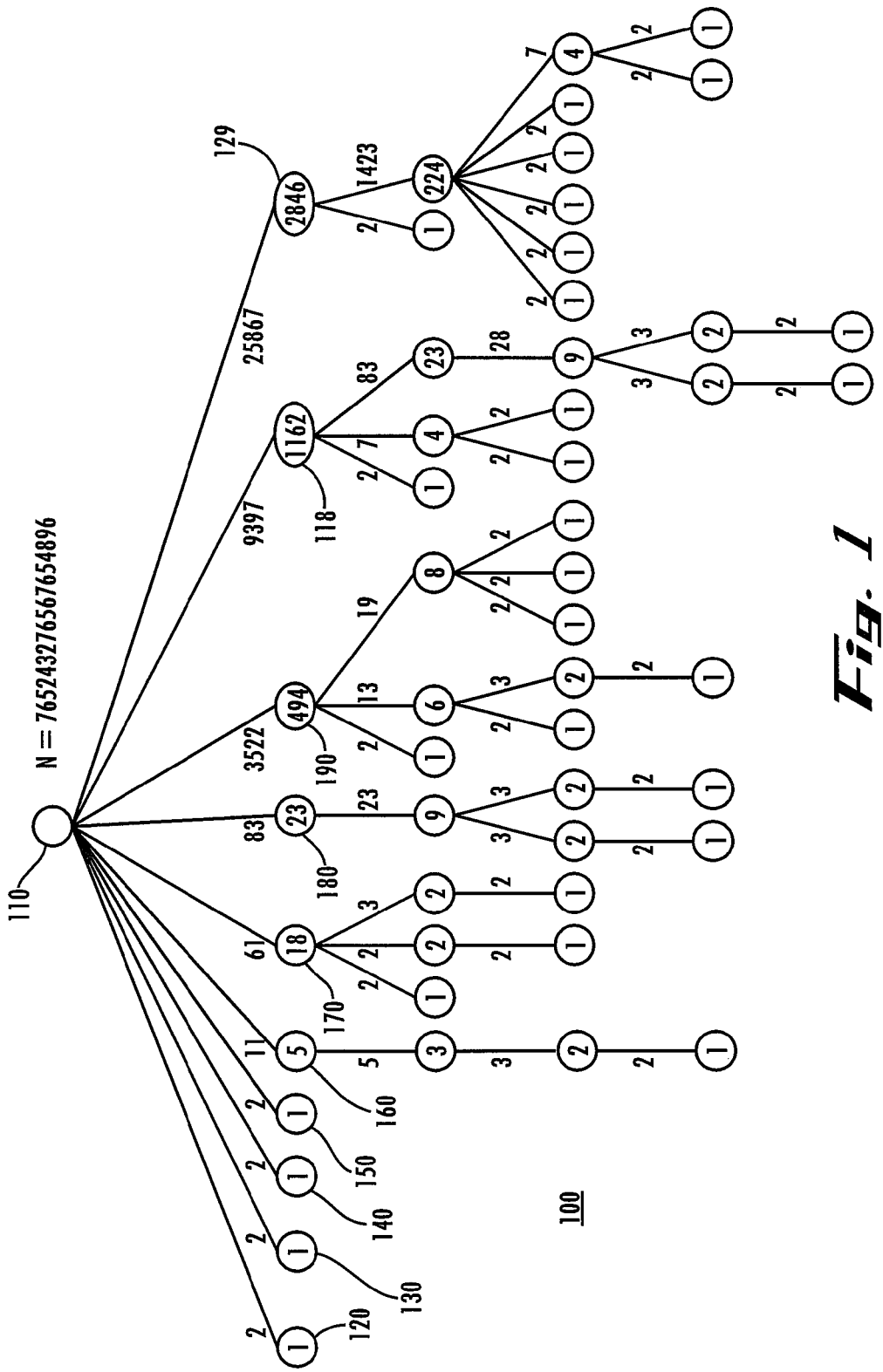
FIG. 1 is a schematic diagram illustrating an embodiment of a tree or tree-like representation.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are techniques used by those of ordinary skill in the data processing arts to convey the substance of their work to others skilled in the art. An algorithm is here and generally considered to be a self-consistent sequence of operations and/or similar processing leading to a desired result, such as for a practical and/or useful application. The operations and/or processing may involve physical manipulations of physical quantities. Typically, although not necessarily, these quantities may take the form of electrical and/or magnetic signals capable of being stored, transferred, combined, compared and/or otherwise manipulated to implement claimed subject matter typically. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer and/or a similar electronic computing device, that manipulates and/or transforms data represented as physical electronic and/or magnetic quantities and/or other physical quantities within the computing platform's processors, memories, registers, and/or other information storage, transmission, and/or display devices.

As previously indicated, secure data encryption is an issue that pervades society. New and/or improved techniques for data encryption continue to be sought. Likewise, typically, the more secure a particular encryption technique, the more complex it may be; however, the more complex it may be, the greater amount of resources that may potentially be involved to utilize it. For example, it may consume more computing resources, it may employ more memory and/or generally it may have a larger "footprint," for example. In this context, having a larger footprint refers to employing more environmental or operational support for a given feature set, which could be manifested in a variety of ways, including as greater compute intensity, as employing more memory, and/or additional aspects that consume resources, including combinations of the foregoing, which also could also mean, for example, larger physical dimensions for a given capability. Thus, approaches that have the ability to provide similar and/or equivalent security while potentially employing fewer resources and/or approaches that may permit trade-offs to be made between levels of security and the amount of resources consumed to provide such levels of security may be desirable.

Although claimed subject matter is not limited in scope in this respect, one embodiment of a technique for data encryption is described in more detail hereinafter. In this context, the term encryption generally refers to a process of disguising a message so that its content is not readily apparent and/or readily discoverable. In this context, this may also be referred to as a secure message or secure data, although different levels of being secure are possible and included within the scope of claimed subject matter, as shall become more clear. In this context, the terms encipher and decipher are interchangeable with the terms encrypt and decrypt, respectively. For example, in this context, an unencrypted message may be termed or referred to as plaintext and an encrypted message may be termed or referred to as ciphertext. Thus, it is appreciated that the terms plaintext and ciphertext are not, in this context, necessarily limited to text content.

In this context, a message includes any information to be communicated, regardless of form, and may include, without limitation, for example, a stream of bits, a text file, a bitmap, a stream of digitized voice, a digital video image and/or the like, including any combinations thereof. Frequently, although not necessarily, a message may be operated on by a computer and/or other computing platform, in which case, the data format generally may comprise or be converted to a binary digital representation. In one particular embodiment, as described in more detail hereinafter, a message may be encrypted based at least in part on a hierarchical symbol assignment system. In this context, the term hierarchical refers to a precedence relationship. Without limitation, for example, a tree or tree-like structure is one common technique for representing a hierarchical precedence relationship. Likewise, in this particular context, the term symbol assignment system generally refers to a set of rules for assigning meaning to symbols. Thus, a hierarchical symbol assignment system generally refers to a set of rules for assigning particular meaning to symbols. Thus, in this context, a hierarchical symbol assignment system refers to a set of rules for assigning particular meanings to symbols in which particular meaning is assigned to particular symbols based at least in part on a chosen precedence or ordering, as described in more detail hereinafter.

However, as shall become clear, in particular embodiments, for example, a hierarchical symbol assignment system is capable of being represented as a numerical value, also referred to herein as a numerical value representation, as described in more detail hereinafter. Of course, for the purposes of claimed subject matter, the particular hierarchical symbol assignment system is not limited in scope to being represented as a numerical value. For example, it may also potentially be presented in others forms, such as, without limitation, a tree or tree-like structure or representation, a string or string-like structure or representation, a matrix or matrix-like structure or representation, etc. Thus, presentation or representation in any particular form, for example, such as, without limitation, a numerical value may be convenient depending at least in part on a variety of factors, such as the particular context, for example.

In this context, the term data encryption system is intended to comprise a variety of data security mechanisms or systems. For example, in one embodiment, such a system may comprise a key management system including a set of protocols, such as a public/private key protocol and/or a symmetric key protocol, for example, although claimed subject matter is not limit in scope in this respect. In this context, the term key is intended to refer to information that, if known, would either permit a message to be encrypted or which would, if known, permit an encrypted message to be decrypted. In this context, a symmetric key protocol, symmetric key process, symmetric key system and/or the like generally refers to data encryption in which the encryption key may be determined or obtained from knowledge of the decryption key and vice-versa. For example, in such an approach, the encryption and decryption keys may be the same, although this is, of course, not a requirement. Typically, in such an approach, for example, a sender and receiver may agree on a key so that they may communicate securely, in a secure communications context, for example. In contrast, in this context, a public/private key protocol, public/private key process, public/private key system and/or the like refers to a process in which it is difficult to calculate the decryption key from the encryption key. Thus, in such an approach or system, in a communication context, for example, two separate keys are employed, a public key and a private key. In such an approach, the encryption key is made public while the decryption key is kept private. Although claimed subject matter is not limited in scope in this respect, it is typical the case that a decryption key cannot, in any reasonable amount of time, be calculated from the encryption key using state of the art technology. Well-known examples of such an approach using so-called asymmetric processes include: Diffie-Hellman key exchange, Merkle knapsack, RSA-public key method using exponentiation and discrete logarithm algorithms, elliptic curve cryptography (ECC) and the like.

Likewise, without limitation, it may be convenient in this context to divide a symmetric key process or approach into two categories, although, of course, claimed subject matter is not limited in scope in this respect. One approach is referred to here as a stream cipher or stream process in which a message is operated on a single character, symbol or other component of a message, such as a bit or byte, for example, at a time. The other approach operates on groups of characters, symbols or components of a message, referred here to as a block. Thus, these are referred to here as block ciphers. It is noted that the forgoing examples and description are simply intended to illustrate a variety of data encryption systems and claimed subject matter is not limited in scope to any particular variety or system.

For example, in one particular embodiment, a hierarchical symmetric encryption scheme is employed. It is noted that the embodiment described below employs trees or tree-like representations to depict hierarchical arrangements or structures; however, claimed subject matter is not limited in scope to employing trees or tree-like representations. Likewise, in this context, compression refers to a process in which the encrypted message is shorter than the unencrypted message, although claimed subject matter is not limited in scope to encryption schemes that also compress information or data. Nonetheless, in the embodiment described below, in addition to encryption, some amount of data compression may also take place. Furthermore, as described in more detail below, it may be a feature of one embodiment to trade off data security with compression, although claimed subject matter is not limited in scope in this respect.

Thus, for this particular embodiment, the key employed to encrypt a message is based at least in part on an encoding tree. Likewise, for this particular embodiment, the key may be updated frequently, arbitrarily and/or by a specified protocol for potentially additional security, although claimed subject matter is not limited in scope in this respect. The aspect of this particular embodiment shall be described in more detail below.

For example, imagine at least two entities, individuals, or ends of a communication channel, referred to here as a sender and receiver. In this example, these shall, without loss of generality, be referred to as Alice (A) and Bob (B). Furthermore, it is understood that A and B may refer to devices, platforms, accounts, software and/or the like for implementing encryption, for example, rather than individuals or entities necessarily. In this particular embodiment, A and B may independently construct a unique tree from a given initial key. Although claimed subject matter is not limited in scope in this respect, it is noted, for example, that A and B may communicate this initial key securely by a mutually identified public/private key process or exchange protocol, such as one of the approaches previously described, for example. Of course, claimed subject matter is not limited in scope to communicating an initial key through any particular mechanism.

In this embodiment, a tree thus derived may be used to encode a message to be communicated, referred to here as an encoding tree. However, as shall become more clear, in this particular embodiment, encoding or an encoding mechanism is based at least in part on an encoding tree derived at least in part from a key, which in one representation assumes a numerical value. Yet, as shall also become more clear, the complexity of encoding or the encoding mechanism is more complex than may be obtained by employing state of the art technology to directly employ a particular numerical value representation to encrypt the message. Rather, a numerical value representation, in this particular embodiment, also, in effect, provides specific information about how to encrypt a message that is not known prior to receiving a numerical value representation. More specifically, in this particular embodiment, a numerical value representation at least partially characterizes a more complex symbol assignment to employ to encrypt a message.

Likewise, as noted above, while this particular embodiment employs a tree or tree-like data structure as a hierarchical symbol assignment system, claimed subject matter is not limited in scope to employing a tree or tree-like representation as a hierarchical symbol assignment system. For example, alternatively, a matrix or matrix-like representation may be employed, as described in more detail below. One advantage of employing a matrix or matrix-like representation is that it may permit matrix or matrix-like operations and/or calculations to be applied, such as may be accomplished on a computing platform, for example. Nonetheless, in some embodiments, depending at least in part, for example, on the particular application, a tree or tree-like representation or a string or string-like representation for a hierarchy may be employed rather than a matrix or matrix-like representation. For example, a tree or tree-like representation may be useful in some contexts to graphically illustrate the symbol assignment. Likewise, a string or string-like representation may be desirable in some contexts by providing hierarchical information in a one dimensional representation.

As an example, but without limiting the scope of claimed subject matter, consider the numerical value 765243276567654896, also referred to here as N. This numerical value may be factored into the following primes as:

$$N = 2^4 \cdot 11 \cdot 61 \cdot 83 \cdot 3533 \cdot 9397 \cdot 25867.$$

For example, in one embodiment, without intending to limit the scope of claimed subject matter, N may be factored using trial division in which N is repeatedly divided by prime numerals. Likewise, N may be represented as a tree, designated by reference numeral 100, as illustrated in FIG. 1. A numerical value N in this particular embodiment is employed as a root node index.

A tree or tree-like arrangement or structure 100 may be constructed in the following manner, although claimed subject matter is not limited in scope in this respect. As shown in FIG. 1, tree or tree-like arrangement or structure 100 may comprise a root node 110 and one or more child nodes, such as child nodes 120, 130, 140, 150, 160, 170, 180, 190, 118, and 129. N may be factored by any one of a host or variety of techniques, such as, for example, the technique as described above, although claimed subject matter is not limited in scope in this respect. Multiplicity (here, exponent) of a prime factor for this particular embodiment may determine at least in part the number of edges and child-nodes, which may be joined at a parent node (in this example, root node). Edge labels or indices that are joined at a given node may be multiplied together to form a node index or label. In this embodiment, a child node index comprises a mapping of a specified prime numeral. In this particular embodiment, a mapping such as the Kleene enumeration may be employed, although claimed subject matter is not limited in scope in this respect. However, for this particular embodiment, by way of example, 1 is the pre-mapping of 2 and 5 is the pre-mapping of 11, for example. Thus, here, the index of the prime 2 is 1 and the index of the prime 11 is 5. Likewise, then, the child node of 11 is 5, for example. Of course, if the index is not prime, such as the index of 7, which is 4, then it is factored as described above. Likewise, in this particular embodiment, a node having 1 as an index is by convention a leaf node. The procedure just described therefore continues until paths emanating from root node end with a leaf node. Of course, a host of different trees or tree-like structures may be constructed and/or associated with a particular numerical value representation and claimed subject matter is also not limited in scope to this particular approach to forming a tree or tree-like representation from a numerical value representation. In fact, an infinite variety of different trees or tree-like representation may be constructed and/or associated and claimed subject matter is intended to cover them all. Likewise, claimed subject matter is also not limited to a tree or tree-like representation for N, as previously indicated and as described in more detail hereinafter.

To implement this, although claimed subject matter is not limited in scope in this respect, it may be convenient to store a table of prime numerals along with a numerical index, although, as described in more detail below, claimed subject matter is not limited in scope in this respect. For example, in an alternate embodiment, rather than a table, indices, such as from the Kleene enumeration, for example, may instead be computed and/or combinations of a variety of approaches may be employed. In an embodiment that employs storage at least in part, the size of the particular table that is to be stored may represent a trade-off between storage space available and computation capability, for example, for the particular computing platform.

In this context, the tree embodiment illustrated in FIG. 1 is referred to as a multi-way tree. In particular, as illustrated, any node of the tree may have a multiple number of branches and/or child nodes emanating from it away from root or generally, away from a parent node. Thus, here, there are multiple levels and multiple positions (such as nodes, for example) at different levels. Of course, in an alternate tree embodiment, nodes and edges may be interchanged, for example. As another example of another tree construction, in an alternate embodiment, a binary tree may be constructed.

Figures 2, 3:
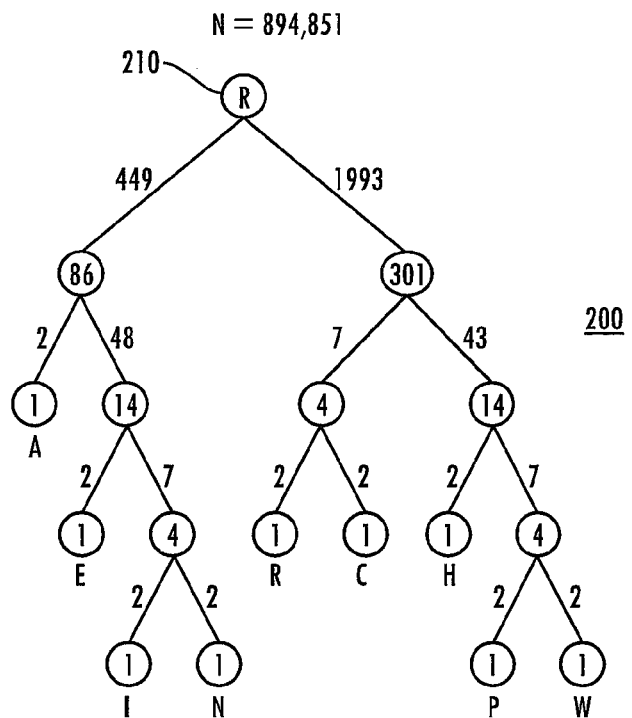
FIG. 2 is a schematic diagram illustrating another embodiment of a tree or tree-like representation.
FIG. 3 is a schematic diagram illustrating a code having a substantially instantaneous coding/decoding property based at least in part on the embodiment of FIG. 2.

A binary tree representation refers is a special case of a multi-way tree representation. In a binary tree, any node may have at most two branches emanating from it away from root. FIG. 2 is a schematic diagram illustrating an embodiment of a binary tree representation 200. As illustrated, binary tree representation 200 may include one or more nodes 210. Thus, and as previously indicated, a host of different types of trees or tree-like representations may be constructed and claimed subject matter is not limited in scope to a particular approach.

Likewise, as discussed in more detail below, a hierarchical structure may be represented in other ways bearing no graphical resemblance to a tree structure. Examples include representation as a string, a matrix, and/or a numerical value. As previously indicated, while there may be advantages in any particular situation to employing one particular representation over another, it shall also be understood that these representations may be interchanged without loss of information or data. Thus, claimed subject matter is not limited in scope to employing any particular representation.

Nonetheless, continuing with the discussion here of one particular embodiment, assuming that A and B employ a common approach, by exchanging a numerical value representation, for example, a hierarchical symbol assignment system may be constructed, in this example, to encrypt a message. For example, without loss of generality, in one embodiment, a numerical value representation may be converted to a tree representation having 256 "leaves." In this context, as indicated above, the term leaf refers to a node that has no child nodes no edges that extend from it.

Figures 4, 5:
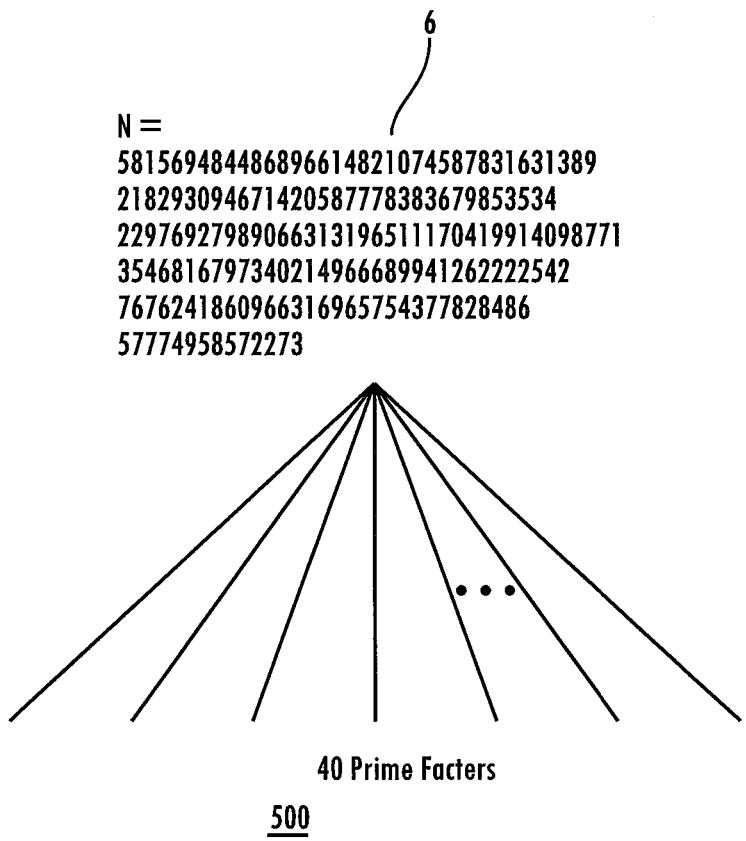
FIG. 4 is a schematic diagram illustrating an embodiment of a matrix or matrix-like representation of the embodiment shown in FIG. 1.
FIG. 5 is a schematic diagram illustrating a portion of yet another embodiment of a tree or tree-like representation.

A tree in this context may include a simple, undirected, connected, acyclic graph. Here, as previously indicated, final edges and nodes are called tree leaves. Thus, in such an embodiment, leaves of such a tree may represent an assignment between symbols of 256 ASCII characters, 8-bit gray levels, or any other alphanumerics, alphabets, or groupings of bits, which contain 256 elements in the symbol set. Without loss of generally, one such tree is illustrated in FIG. 5.

In the above example, a one-to-one mapping is applied between a symbol set and leaves of the tree. However, a one-to-one mapping is only illustrative. As previously indicated, many possible trees and/or tree-like representations may be constructed. Therefore, a numerical value representation may be converted to a tree or tree-like representation with an arbitrary number of leaves. Thus, a tree may be constructed, for example, in which the number of leaves corresponds to the number of members in a given symbol set, e.g. an alphabet, if desired. Nonetheless, for the purposes of this particular embodiment, given a specified number of symbols, for example, 256, these symbols may alternately be mapped or assigned to a tree having an arbitrary number of leaves, as described below. Of course, as previously suggested, claimed subject matter is not limited in scope to employing any particular mapping or symbol assignment. However, to summarize, for the embodiment just described, symbol assignment may include: selecting a desired symbol set; constructing a particular hierarchical representation, such as, for example, a tree or tree-like representation; assigning symbols based at least in part on the hierarchical representation; and employing the resulting assignment to encode symbols, although, claimed subject matter is not necessarily limited in scope to this particular approach.

Likewise, as shall be explained in more detail hereinafter, members of a symbol set, e.g., an alphanumeric set, such as defined by ASCII or Unicode conventions, for example, may be assigned to a sequence of one or more bits in an hierarchical symbol assignment system so that delimiters between symbols are not needed if a message is being transmitted using bit groupings. Of course, in other embodiments, symbols may be assigned to other characters or representations other than sequences of one or more bits. In this context, a data encryption or decryption system exhibiting this property shall be referred to as a substantially instantaneous cipher system. Such a system may be employed in this context to implement encoding and/or decoding, although claimed subject matter is not limited in scope in this respect.

For example, FIG. 3 is a diagram 300 illustrating an assignment of bits to symbols in which the foregoing property is present. As illustrated, this particular assignment is based at least in part on a construction of a binary tree, although, as previously explained, claimed subject matter is not limited in scope in this respect. Various rules may be defined to implement this property. However, here, a tree data structure or representation may instead be employed to implement such a property, as illustrated in FIG. 3, for example. In this particular embodiment, the nature of a substantially instantaneous cipher system may reside at least in part in various sets of dichotomies that may be made via a tree or tree-like representation. These dichotomies may be labeled or otherwise identified via edge and/or node labels, as described in more detail hereinafter. Various symbol assignments other than those illustrated below may be used. The example below illustrates an embodiment in which an encoding is based at least in part on an alphabetic ordering/mapping to a tree ordered at least in part by increasing prime factors. Other ordering conventions are, of course, possible and included within the scope of claimed subject matter whether in connection with binary trees or tree-like structure, other trees or tree-like structures, or other hierarchical structures, arrangements or representations.

A substantially instantaneous cipher property may also be combined with codes including a priori knowledge of symbol frequencies, which may enable codes to be produced via various methods in which the amount of bits to be transmitted may be reduced in comparison with alternate assignments. Examples of such approaches include Shannon-Fano coding, Huffman coding, and others. See, for example, *Data Compression, the Complete Reference,* 3d Edition, 2004, by David Saloman, available from Springer. Again, claimed subject matter is not limited in scope to employing this approach. It is likewise noted that in these and/or in other alternative embodiments, it may be desirable that modulation and/or demodulation techniques also be included, such as those commonly used, for example, in connection with communications systems, although, claimed subject matter is not limited in scope in this respect.

Figures 6, 7:
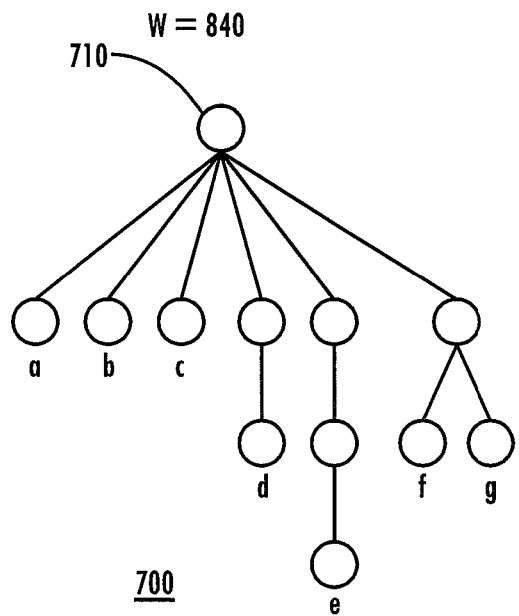
FIG. 6 is a schematic diagram illustrating an embodiment of a string or string-like representation of the embodiment shown in FIG. 1.
FIG. 7 is a schematic diagram illustrating yet another embodiment of a tree or tree-like representation.

We, likewise, note that, rather than constructing a tree or tree-like representation, alternately, a matrix or matrix-like representation, such as illustrated in FIG. 4, and/or a string or string-like representation, such as illustrated in FIG. 6, may be constructed from a numerical value representation, such as N. Thus, referring to FIG. 4, and comparing it with FIG. 1, in this example, there are 0.2 "leaves" at a bottom level, the last row's xs indicating that a 0 (here a node) on the next-to-last row gets a leaf. Thus, referring to FIGS. 1 and 4, at one level, there are 4 leaves and 6 nodes, and so on.

For this particular embodiment of a matrix or matrix-like representation, the number of xs in a particular row, denoted r, is the number of 0s (or nodes) in the previous row, although claimed subject matter is not limited in scope in this respect. Thus, for this embodiment, delimiter x indicates the end of a node listing. It is noted that this particular embodiment of a matrix or matrix-like representation, as previously suggested, is interchangeable with the previously described embodiment of a tree or tree-like representation. Thus, as previously indicated, one may be employed in place of the other without a loss of information or data. In this context, these representations shall therefore be referred as isomorphic. However, despite being isomorphic, it is noted that, depending at least in part on the particular situation, one representation may provide advantages that may not be present for another representation, as previously described.

Likewise, FIG. 6 illustrates a parsed-string representation, in which, in this embodiment, braces indicate depth within a tree hierarchy, with 1s indicating leaves. It is noted that this embodiment of a string representation is therefore isomorphic to the tree or tree-like representation of FIG. 1 and the matrix or matrix-like representation of FIG. 4. As previously indicated and at the risk of being repetitive, for the purposes of this embodiment, hierarchical representations, such as a tree or tree-like representation, a matrix or matrix-like representation and/or a string or string-like representation, for example, may be interchanged; nonetheless, depending at least in part upon the particular situation, there may be one or more advantages of employing one representation embodiment over another representation embodiment.

It is, of course, appreciated that, in some respects, for this particular embodiment, N has a relatively simple factorization. Associated tree-matrix-string representations are also not particularly complex, as illustrated in FIGS. 1, 4, and 6, for example. In contrast, some numerical value representations may be so large and/or difficult to factor that doing so is not considered technically feasible, at least with state of the art technology.

In one embodiment, it may therefore be desirable for A or B to select a numerical value representation that may be converted to a hierarchical symbol assignment system relatively rapidly or at least conveniently. One technique for selecting a numerical value is to employ numerical values referred to in this context as "L-smooth." A numerical value N is said to be L-smooth if no prime factor of N exceeds L. For example, if:

$$N = P_1^{e(1)} \cdot P_2^{e(2)} \cdot P_3^{e(3)} \cdot \ldots$$

where $P_1$, $P_2$, $P_3$, etc. are prime factors.

It is useful to observe that there is no a correlation between being L-smooth, such as 2-smooth, for example, and magnitude. For example, $2^{1000}$ is 2-smooth. Of course, in this particular context, if a numeral value N is L-smooth, it is also L+1-smooth, L+2-smooth, etc. Thus, numeral value N is also L'-smooth, where L' is greater than L.

In this particular embodiment, Alice and Bob may employ the property of L-smoothness to find a mutual tree or tree-like representation based at least in part on a numerical value representation. For example, assume secret numerical value representation K is known to both Alice and Bob, as well as a smoothness limit L, which is not necessarily secret. As previously suggested, Alice and Bob may use a public/private key encryption system, in one embodiment, to securely communicate K, although claimed subject matter is not limited in scope in this respect.

Nonetheless, in this particular embodiment, Alice and Bob may independently, increment K until an L-smooth numerical value, N=K+k, is reached. Alice and Bob may generate a hierarchical symbol assignment associated with N, which is feasible at least in part because N is L-smooth. Thus, Alice and Bob may transmit and receive encrypted messages that may be decrypted using the particular hierarchical symbol assignment represented by N in this particular embodiment.

It is noted that Alice and Bob may employ trial division, for example, to determine if N is L-smooth, although claimed subject matter is not limited in scope in this respect. Other techniques may also or alternatively be employed. For example, a trial division or sieving technique may be employed. Again, claimed subject matter is not limited in scope to employing any particular technique to determine whether any particular numerical value representation is L-smooth. It is intended to cover all possible techniques.

As one example, as previously described, trial division may be employed. In another approach, a binary digital value may be selected by any one of a number of techniques. A position of a bit, such as, a zero bit, as one example, may signify a particular prime factor and the numerical value N may comprise the product of such prime factors. To use a simplistic example simply for illustration of the approach, the binary digital value 11011011 may indicate the product of the third prime factor with the sixth prime factor, or five times thirteen. Of course, instead, this binary digital value may signify the product of the $1003^{rd}$ prime-factor with the $1006^{th}$ prime factor as well. One-advantage of this approach is that trial division is reduced or avoided. Likewise, a table of primes and their indices may be stored, the associated indices of particular primes may be computed, hybrid approaches may be employed, and so forth.

In similar approach, sieving techniques may be applied using a table of primes, associated indices, and associated residues corresponding to remainders for the particular primes. In this context, sieving refers to a variety of techniques for more efficiently arriving at such residues from stored information that is typically more efficient than applying conventional division, for example. See, for example, Crandall, R. and Pomerance, C. 2001, *Prime numbers: A Computational Perspective*, Springer-Verlag. For one particular embodiment in which such a table may be employed, for example, the residues produced for a table of primes associated with a given divisor, for example, may be employed to select prime factors similar to the approach just described using a binary digital value. For example, those primes having a zero residue from a given divisor may be employed as the prime factors to compute N, although, again, this is merely one embodiment and claimed subject matter is not limited in scope to this particular embodiment.

However, it is likewise noted that other approaches to assigning symbols from a hierarchical assignment system are also included within the scope of claimed subject matter. Here is a simple example, not intended to be limiting in any way, in which it is assumed that N=840. FIG. 7 is a schematic diagram illustrating an embodiment 700 of a tree or tree-like representation. Below 700 in FIG. 7 is an embodiment 710 of a string or string-like representation. Likewise, the leaves of embodiment 700 are assigned symbols, as illustrated. Using this tree or tree-like representation to assign bit groupings to these particular symbols provides the following assignment:

a is assigned {{0
b is assigned {{1
c is assigned {{2
d is assigned {{{0
e is assigned {{{{{0
f is assigned {{{{{{0; and
g is assigned {{{{{{1.

The assignment above may be compared with FIG. 7. As illustrated, brackets are employed in this embodiment to depict level and numerals are employed to depict position on a given level. Thus, as suggested, this provides another technique for assigning symbols for a multi-way tree in which there are multiple levels and multiple positions (such as nodes, for example) at different levels. Likewise, any one of a host of potential encoding techniques may be employed to translate or assign the alphabet above to unique, non-repetitive binary digital sequences. See, for example, *Data Compression, the Complete Reference,* 3d Edition, 2004, by David Saloman, available from Springer. Thus, this example illustrates one potential approach in which a numerical value, such as, in this example, 840, may be employed to communicate a hierarchical assignment system. Of course, this is simply one example of a technique for converting a numerical representation to a tree or tree-like representation and claimed subject matter is not limited in scope to this particular example or this particular embodiment. Many other approaches are possible and are included within the scope of claimed subject matter. It is also worth observing that here a matrix or matrix-like representation may be constructed in an alternative implementation.

However, rather than employing the approach just described, assume for this example that the previously described approach of transmitting an L-smooth numeral value is employed. As suggested previously, the particular value communicated may be employed to construct a hierarchical representation that both sender and receiver may employ to encrypt and/or decrypt messages. Likewise, in an alternate embodiment, Alice and Bob may change encryption keys as often as desired. For example, the frequency at which keys are changed may be defined by a predetermined protocol. In one such embodiment, N could be incremented after every symbol for a high-level of security, corresponding to a "one-time" pad between Alice and Bob. Alternatively, a change protocol could be defined as every K-symbols and/or at certain intervals of time. Also, a transition to a next key may be predefined. For example, Alice and Bob may increment a current N to find a next L-smooth numerical value representation. Likewise, the smoothness limit, L, may be modified in some agreed upon fashion, for example.

Alternately, a next key could be determined by transmitting a key change code or a next key could be determined by a transmitted message, in the form of a hash function or other approach that transforms a message to a coded value to initiate a next key in a chain. Likewise, a quasi- or pseudo-random process known to Alice and Bob may be employed to determine a next L-smooth key value. In fact, a host of computational approaches to finding L-smooth numerical values may be employed to produce a smooth numerical value representation engine, including, for example, the Chinese remainder theorem, the partial factorization theorem, and/or the quadratic sieve. See, for example, Crandall, R. and Pomerance, C. 2001, *Prime numbers: A Computational Perspective*, Springer-Verlag. For example, a sieve may be employed in which a table of residues is stored and recomputed if K is incremented, as described previously, for example. It is intended to cover any and all such approaches. Of course, a trade-off may also exist between level of security and processing capability that may, depending upon the particulars of the situation, affect how frequently it is desirable to change N, whether by increment, decrement, or otherwise. Thus, this particular embodiment may also provide the capability to make trade-offs between security level and resource allocation. Again, claimed subject matter is not limited in scope to the foregoing particular examples and it is intended to cover all possible approaches for switching keys and/or for determining a next key. As another example, key switching may occur asynchronous with message transmission and receipt. Thus, key switching may take place independent of message communication, for example.

Figure 8:
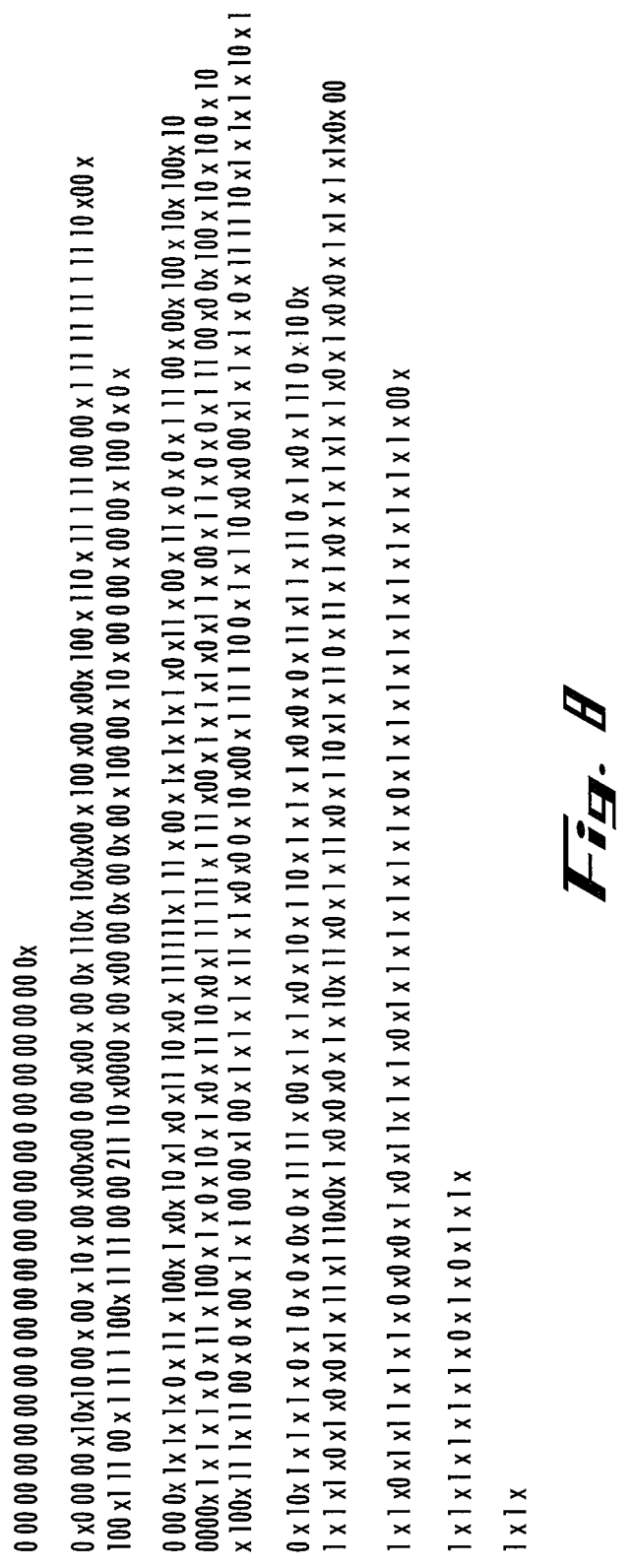

FIG. 5 illustrates a numerical value representation that if produced as a tree representation would have 256 leaves, as discussed. In matrix form, in FIG. 8, 256 "1" s are illustrated. This hierarchical symbol assignment is generated from a 100000-smooth numerical value representation. N 6, here, has 40 prime factors 500, each with multiplicity 1, and a tree is represented in this embodiment by a matrix with 7 rows. Tree width (count of 1s) here is 256. Here, without loss of generality, N 6 was chosen to illustrate a specific example of encoding of 256 symbols. Thus, in this embodiment, the matrix of FIG. 8 illustrates a "mutual pad" between Alice and Bob. However, as previously discussed, in an embodiment, this pad may be switched at the leisure of the two parties, such as periodically, chaotically, and/or in a conditional fashion, for example.

Likewise, although claimed subject matter is not limited in scope in this respect, as described previously, in some embodiments it may be desirable to trade-off compression and security level. In one embodiment, for example, although claimed subject matter is not limited in scope to this particular embodiment, construction of a matrix or matrix-like representation may permit this trade-off to be made. As one example, symbols that are relatively frequent in terms of statistics, for example, may be positioned in row and column locations so as to improve compression. Likewise, in yet another approach, symbols may be positioned in a matrix or matrix-like representation so as to form a "space-filling" curve. Thus, a symbol may be associated with a unique value corresponding to row and column locations that "fills" or substantially fills the matrix. One example of such a curve is a serpentine arrangement, although, of course, claimed subject matter is not limited in scope to this example. This may, for example, provide benefits in terms of potentially efficient use of storage and potentially efficient use of processing capability, although, again, claimed subject matter is not limited in scope in this respect.

In an alternate embodiment, assume an alphabet A and a given symbol s represented as a numerical value in $[0, |A|-1]$. In this particular embodiment, Alice and Bob may obtain a tree, denoted here as T, via a numerical value representation N, such as previously described, for example, although, again, claimed subject matter is not limited in scope in this respect. Here, denote by numerical value representation, m, the number of 1s in a matrix representation, such as using the approach previously described, corresponding to tree presentation T. In such an embodiment, assuming m is less than s we may set:

$$w = \text{floor}(s/m);$$

$$u = s \bmod m;$$

where operation "floor" provides the integer part of the indicated division and operation "mod" provides the residue of the indicated division.

Thus, for the u-th 1 in such a matrix representation, we locate row, column indices (r, c). With this approach, a symbol s may be encoded as a triple (w, r, c), in which (r, c) in this particular embodiment indicates a set of bits assigned by a particular hierarchical symbol assignment. It is noted that this particular embodiment permits one to use trees with an arbitrary number of leaves for any given symbol set. Thus, while a previously described embodiment involved a one-to-one mapping between elements in a symbol set and number of leaves, this embodiment does not necessarily involve a one-to-one mapping.

There are, of course, many ways in which bits may be assigned based at least in part on a particular symbol assignment and claimed subject matter is not limited in scope to a particular approach. For example, statistical and other methods of various forms, e.g., entropy encoding, for example, may be employed in one embodiment. For example, without loss of generality, as is well-known, one approach includes applying statistical methods to develop or formulate variable-size codes, typically with the shorter codes assigned symbols or groups of symbols that may appear more often in the data or may have a higher probability of occurrence, for example. Thus, typically a priori knowledge as to these probabilities may be available and, if so, may be used in the assignment process. Variable code approaches may in some situations be employed to address at least two issues. One potential issue to be addressed comprises a code assignment in which delimiters between symbols may be omitted. As described previously, the term substantially instantaneous has been employed in this context to describe a code assignment exhibiting this particular property. Another issue comprises assign codes with so that the average size of a message is shorter than may occur through other potential code assignments or at least some other potential code assignments. The term entropy encoding may at times be used to refer to this latter feature or property of a particular code assignment in which the term "entropy" refers to one or more well-known information content metric. Many examples of entropy encoding are known and more are likely to be developed. Although claimed subject matter is not limited in scope to employing entropy encoding, likewise, entropy encoding may be a feature of particular embodiments included within the scope of claimed subject matter, depending at least in part on the particular situation.

Likewise, bit-obfuscation may also be employed in some embodiments. In this context, bit-obfuscation refers to permuting encoded symbols, characters and/or other representation components to hide or obfuscate potential residual characteristics of an encrypted message so as to make the content of the encrypted message more difficult to uncover. Bit-obfuscation methods are well-known and may involve, for example, pseudo-random permutations and/or associated generating functions. See, for example, M. Luby and C. Rakoff, "How to Construct Pseudorandom Permutations from Pseudorandom Functions," *SIAM Journal on Computing*, 17(2):373-386, 1988; M. Naor and O. Reingold "On the Construction of Pseudo-random Permutations: Luby-Rackoff revisited," STOC 1997 El Paso, Tex. USA. ACM 0-89791-888-G/97:05; M. Naor and O. Reingold "Number-theoretic Constructions of Efficient Pseudo-random Functions," J. ACM, vol. 51, No. 2, March 2004, pp. 231-262.

In one embodiment, for example, pseudo-random permutations may be employed that relate at least in part to a particular L-smooth numerical value representation employed as a key, although claimed subject matter is not limited in scope in this respect. Likewise, a next symbol may be encoded and transmitted in a similar fashion, although, a mutual tree may be switched, if desired, such as previously described.

In alternate embodiments, it is noted that N-dependent bit-obfuscation may be omitted in favor of switching mutual trees more frequently. Likewise, rather than or in addition to employing entropy encoding, other forms of encoding may be employed. For example, Golomb or recursive Elias coding according to a frequency of occurrence of various symbols may be employed. See, for example, Chapter 2, titled "Statistical Methods" of *Data Compression, the Complete Reference*, 3d Edition, 2004, by David Saloman, available from Springer. Alternately, permutations of an alphabet may be made using pre-determined statistics, using dynamic statistics, such as statistics of a prior message, as one potential example, or various possible combinations of approaches to arrive at statistics to apply. If bit-obfuscation is employed, such as, for example, as previously described, compression and encryption may be accomplished, again, such as previously described, for example, by compressing information or data prior to bit obfuscation. Likewise, as implied above, if, for the particular application, the alphabet size is less than the 1s count m, then w=0 and there is no need to encode a so-called "wraparound" w. As previously indicated, use of such an embodiment permits employing a tree with an arbitrary amount of leaves. Thus, such an approach may provide desirable benefits, depending on the particular context, although, of course, claimed subject matter is not limited in scope in this respect.

It is noted that previously described embodiments provide examples of a symmetric cipher system, meaning here that Alice and Bob both employ symmetric keys. Likewise, while Alice and Bob may have the capability to change encryption on each character or symbol transmitted, this may not necessarily occur, depending at least in part on the particular application. Thus, embodiments may relate to block or stream ciphers, although claimed subject matter is not limited in scope in one, the other, or both.

It is likewise noted that some embodiments may employ techniques to further enhance the security of encryption, although claimed subject matter is not limited in scope to these techniques. For example, it may be desirable to omit representation values of N as a key in which N comprises a perfect power numerical value representation. Likewise, values of N that employ relatively small factors may be omitted in some embodiments, although claimed subject matter is not limited in scope in this respect. For example, it may be desirable to omit values for N which include factors below 100, although, again, this is merely an example. It may also be desirable to employ numerical value representations of N such that a first and last row of a matrix or matrix-like representation, such as in accordance with the approach previously described, for example, may be discarded while retaining the ability to encrypt 256 symbols, for example. Likewise, in embodiments in which w is non-zero, it may be desirable to employ a relatively small value of w, or to switch keys after 8 symbols or less are encrypted. Likewise, if bit obfuscation is employed, it may be desirable to employ pseudo-random operations that employ three or more rounds of a Feistel pseudo-random process. Such pseudo-random process are described, for example, in Schneier, *Applied Cryptography*, $2^{nd}$ edition, Section 14.1, "Theory of Block Cipher Design. Likewise, in an alternate embodiment, a cipher block chaining process may be employed. Such processes are described, for example, in Schneier, Chapter 9 titled "Algorithm types," and Section 8.1, titled "Other Block-Cipher Modes," although, again, claimed subject matter is not limited in scope in this respect. Of course, any process that permutes at least a portion of an encrypted message may be employed. In this context, permuting refers to a process in which particular symbols, characters and/or components of a message, for example, of an encrypted message, regardless of form, are interchanged. For example, in one embodiment, without limitation, bits may be interchanged.

FIG. 9 is a schematic diagram of an embodiment of a security system 1000. Security system 1000 may include various elements or modules such as symmetric encryption 1010, privacy 1020, security system 1030, digital signature 1040, asymmetric encryption 1650, authentication 1060, integrity 1070, or nonrepudiation 1080. This particular embodiment includes desirable features, such as privacy, digital signatures, asymmetric keys, authentication, integrity and/or non-repudiation. Such features are well-known and described in, for example, Schneier, Chapter 1, titled "Foundation." Thus, this particular embodiment may combine an embodiment of a symmetric key encryption system with these other well-known features. For example, without loss of generality, one of the embodiments previously described may also include asymmetric key processes to form an embodiment of a security system, for example. This may, for example, be accomplished using any one of a variety of techniques, such as, without loss of generality, one of the public/private key approaches previously described, for example. It is noted that FIG. 9 in intended to illustrate one potential embodiment. Thus, while for this particular embodiment, authentication, integrity and non-repudiation is shown related to asymmetric encryption, claimed subject matter is not limited in scope in this respect. For example, such features could also be related to symmetric encryption. However, for this embodiment of such a security system, for example, a previously referenced secret numerical value, K, for example, may be communicated using asymmetric keys. As an example, assume Alice's private key comprises "a" and Alice's public key comprises "$g^b$ (mod p)." Likewise, assume Bob's private key comprises "b" and Alice's public key comprises "$g^a$ (mod p)." In this case, K may be computed for Alice as: $(g^b)^a$ (mod p); whereas, K may be computed for Bob as: $(g^a)^b$ (mod p).

It is worth noting that embodiments of claimed subject matter may be employed in a variety of contexts. For example, without limitation, in one embodiment, a browser or other software application may have the capability to perform described operations. For example, such a browser or other software application may apply an approach similar to examples or embodiments previously described. Of course, claimed subject matter is not limited in scope to such examples or embodiments. Likewise, claimed subject matter is not limited to implementation in a browser or other software application. Many other approaches to software, firmware and/or hardware are included within the scope of claimed subject matter.

It will, of course, be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of using one or more processors of a computing device to process binary digital signals in accordance with executable computer instructions, the method comprising:

executing the executable computer instructions on the one or more processors, wherein the computer instructions to be executed comprise instructions for execution of an enciphering process, and wherein the executing the enciphering process instructions further comprises:

constructing a hierarchical symbol assignment system comprising a multi-branch tree based, at least in part, on an ordered factoring of a numerical signal value into prime number signal values, wherein binary signal values of the binary digital signals are assigned to leaf nodes of the multi-branch tree by one or more branched tree assignment rules for assigning particular meanings to symbols contained within a message via the binary digital signals based, at least in part, on the numerical signal value, wherein the symbols respectively comprise character components of the message; and enciphering the message via executing instructions to encipher the message based at least in part on the hierarchical symbol assignment system.

2. The method of claim 1, wherein the numerical signal value comprises an integer signal value represented as the binary digital signals.

3. The method of claim 2, wherein the integer signal value comprises an L-smooth integer signal value represented as the binary digital signals.

4. The method of claim 3, wherein the L-smooth integer signal value excludes numerical signal values that are perfect powers.

5. The method of claim 3, wherein the L-smooth integer signal value excludes numerical signal values that are less than 100.

6. The method of claim 1, wherein the hierarchical symbol assignment system comprises a string symbol assignment system.

7. The method of claim 6, wherein the string symbol assignment system is represented as the binary digital signals in which placement within a string representation determines, at least in part, the symbol assignment.

8. The method of claim 6, wherein the string symbol assignment system is formed, at least in part, by selecting portions to omit from the hierarchical symbol assignment system.

9. The method of claim 1, wherein the hierarchical symbol assignment system comprises a tree symbol assignment system.

10. The method of claim 9, wherein leaves of the tree symbol assignment system determine assignment of symbols to characters at least in part.

11. The method of claim 10, wherein the characters comprise a sequence of one or more bits.

12. The method of claim 1, wherein the hierarchical symbol assignment system comprises a matrix symbol assignment system.

13. The method of claim 12, wherein the matrix symbol assignment system is formed, at least in part, by selecting portions to omit from a matrix representation of a tree structure.

14. The method of claim 12, wherein selected elements in the matrix representation determine, at least in part, an assignment of symbols to characters in a matrix symbol assignment system.

15. The method of claim 14, wherein the characters comprise a sequence of one or more bits.

16. The method of claim 1, wherein the enciphered message is transmitted using signal modulation.

17. The method of claim 16, wherein the signal modulation includes symbol encoding.

18. The method of claim 17, wherein the symbol encoding includes at least one of: Entropy encoding, Shannon encoding, Fano encoding, recursive Elias encoding, Golomb encoding, Huffman encoding or a combination thereof.

19. The method of claim 1, wherein the enciphered message omits delimiter symbols.

20. The method of claim 19, further comprising deciphering the enciphered message using a table look-up process.

21. The method of claim 1, wherein the numerical signal value has an initial signal value; and
the enciphering the message comprises changing the hierarchical symbol assignment system at least partially in response to the numerical signal value changing.

22. The method of claim 21; further comprising executing the computer instructions to initiate communication of the initial signal value via a public/private key enciphering protocol.

23. The method of claim 21, wherein the changing the numerical signal value comprises changing the numerical signal value based, at least in part, on a pseudo-random process.

24. The method of claim 21, wherein the changing the numerical signal value includes determining whether to change the numerical signal value with a replacement numerical signal value.

25. The method of claim 1, wherein the enciphering includes employing operations to permute at least portions of the enciphered message.

26. The method of claim 25, wherein the operations to permute at least portions of the enciphered message include employing a cipher block chaining process.

27. The method of claim 25, wherein the operations to permute at least portions of the enciphered message include employing two or more rounds of a Feistel pseudo-random process.

28. The method of claim 25, wherein the operations to permute are based, at least in part, on an L-smooth numerical signal value-representation.

29. The method of claim 1, further comprising changing an enciphering key signal value to change a level of security of enciphering.

30. The method of claim 29, wherein the changing the enciphering key signal value to change the level of security of enciphering is performed at least partially in response to transmission or receipt of a particular number of symbols or at certain intervals of time.

31. The method of claim 29, wherein the changing the enciphering key signal value to change the level of security of enciphering is performed according to a predetermined protocol.

32. The method of claim 1, wherein the executing the enciphering process instructions further comprises deriving the numerical signal value for the hierarchical symbol assignment system using an encipher key signal value.

33. The method of claim 1, wherein the character components of the message comprise at least one or more symbols of ASCII characters or gray levels.

34. The method of claim 1, further comprising calculating the numerical signal value based, at least in part, on one or more public key signal value parameters communicated between at least two parties on network nodes.

35. The method of claim 1, wherein the enciphering the message further comprises enciphering the symbols of the message based, at least in part, on:
factoring the numerical signal value into the prime number values; and
associating a particular binary signal value with a leaf node character symbol.

36. The method of claim 35, further comprising transmitting the enciphered symbols.

37. The method of claim 36, wherein the enciphered symbols are capable of being deciphered based, at least in part, on an assignment of a leaf node binary signal value to a character symbol.

38. An apparatus comprising: a computing platform to comprise one or more processors and a memory to execute executable computer instructions, the executable computer instructions to comprise instructions stored in the memory and executable by the one or more processors to execute an enciphering process to:
construct a hierarchical symbol assignment system comprising a multi-branch tree based, at least in part, on an ordered factoring of a numerical signal value into prime number signal values, wherein binary signal values are to be assigned to leaf nodes of the multi-branch tree by one or more branched tree assignment rules for assignment of particular meanings to symbols to be contained within a message via binary digital signals to be based, at least in part, on the numerical signal value, wherein the symbols respectively comprise character components of a message;
assign the symbols to characters to be based, at least in part, on the hierarchical symbol assignment system;
encipher the message using the hierarchical assignment system; and
transmit the enciphered message via use of symbol encoding.

39. The apparatus of claim 38, the characters to comprise a sequence of one or more bits.

40. The apparatus of claim 38, wherein the symbol encoding to include at least one of: Entropy encoding, Shannon encoding, Fano encoding, recursive Elias encoding, Golomb encoding, Huffman encoding, or a combination thereof.

41. The apparatus of claim 38, wherein the hierarchal symbol assignment system to comprise a tree symbol assignment system to be represented as the binary digital signals in which the symbols are to be respectively assigned to selected nodes or edges.

42. The apparatus of claim 41, wherein the selected nodes to comprise leaves of the tree symbol assignment system.

43. The apparatus of claim 41, wherein the tree symbol assignment system to comprise a binary tree to be represented as the binary digital signals.

44. The apparatus of claim 41, wherein the tree symbol assignment system to comprise a multi-way tree to be represented as the binary digital signals.

45. The apparatus, of claim 38, wherein the numerical signal value to comprise an integer signal value to be represented as the binary digital signals.

46. The apparatus of claim 45, wherein the integer signal value comprises an L-smooth integer signal value.

47. The apparatus of claim 46, wherein the L-smooth integer signal value excludes numerical signal values that are perfect powers.

48. The apparatus of claim 46, wherein the L-smooth integer signal value excludes numerical signal values that are less than 100.

49. The apparatus of claim 38, wherein an enciphered message is to not include delimiter symbols.

50. The apparatus of claim 38, wherein the enciphered message to be capable of being decrypted via use of a table look-up process after reception.

51. The apparatus of claim 38, wherein the hierarchical symbol assignment system to comprise a matrix symbol assignment system.

52. The apparatus of claim 38, wherein the numerical signal value to have an initial signal value, the to assign symbols to comprise to change the hierarchical symbol assignment system at least partially in response to a change of the numerical signal value, and the to encipher the message to include to encipher the message in accordance with multiple hierarchical symbol assignment systems.

53. The apparatus of claim 52, wherein the initial signal value is to be communicated via a public/private key enciphering protocol.

54. The apparatus of claim 52, wherein the to change the numerical signal value to comprise to change the numerical signal value to be based, at least in part, on a pseudo-random process.

55. The apparatus of claim 52, wherein the to change the numerical signal value to include to determine whether to change the numerical signal value and to determine a replacement numerical signal value.

56. The apparatus of claim 38, wherein the to encipher is to include to employ operations to permute at least portions of the enciphered message.

57. The apparatus of claim 56, wherein the to employ operations to permute at least portions of the enciphered message to include to employ a cipher block chaining process.

58. The apparatus of claim 56, wherein the to employ operations to permute at least portions of the enciphered message to include to employ two or more rounds of a Feistel pseudo-random process.

59. The apparatus of claim 56, wherein the to employ operations to permute are to be based at least in part on an L-smooth numerical signal value to be represented as the binary digital signals.

60. The apparatus of claim 38, wherein the computing platform is to further change an enciphering key signal value to change a level of security of enciphering.

61. The apparatus of claim 60, wherein the computing platform is to perform the change of the enciphering key signal value to change the level of security of enciphering is to be performed at least partially in response to transmission or receipt of a particular number of symbols or at certain intervals of time.

62. The apparatus of claim 60, wherein the computing platform is to perform the change of the enciphering key signal value to change the level of security of enciphering according to a predetermined protocol.

63. The apparatus of claim 38, wherein the hierarchical symbol assignment system is to comprise a string symbol assignment system.

64. The apparatus of claim 63, wherein the string symbol assignment system is to be represented as the binary digital signals in which placement within a string representation is to determine, at least in part, the symbol assignment.

65. The apparatus of claim 63, wherein the string symbol assignment system is to be formed, at least in part, by a selection of portions to omit from the hierarchical symbol assignment system.

66. An article comprising:
a non-transitory storage medium having stored thereon instructions executable by one or more processors to:
construct a hierarchical symbol assignment system comprising a multi-branch tree based, at least in part, on an ordered factoring of a numerical signal value into prime number signal values, wherein binary signal values are assigned to leaf nodes of the multi-branch tree by one or more branched tree assignment rules for assigning particular meanings to symbols contained within a message via binary digital signals based, at least in part, on the numerical signal value, wherein the symbols respectively comprise character components of the message;
assign symbols to characters to be based, at least in part, on the hierarchical symbol assignment system;
encipher the message using the hierarchical assignment system; and
initiate transmission of the enciphered message via use of symbol encoding.

67. The article of claim 66, the characters to comprise a sequence of one or more bits.

68. The article of claim 66, wherein the symbol encoding to include at least one of: Entropy encoding, Shannon encoding, Fano encoding, recursive Elias encoding, Golomb encoding, Huffman encoding, or a combination thereof.

69. The article of claim 66, wherein the hierarchal symbol assignment system to comprise a tree symbol assignment system to be represented as the binary digital signals in which the symbols are to be respectively assigned to selected nodes or edges.

70. The article of claim 69, wherein the selected nodes to comprise leaves of the tree symbol assignment system.

71. The article of claim 69, wherein the tree symbol assignment system to comprise a binary tree to be represented as the binary digital signals.

72. The article of claim 69, wherein the tree symbol assignment system to comprise a multi-way tree to be represented as the binary digital signals.

73. The article, of claim 66, wherein the numerical signal value to comprise an integer signal value to be represented as the binary digital signals.

74. The article of claim 73, wherein the integer signal value representation comprises an L-smooth integer signal value.

75. The article of claim 74, wherein the L-smooth integer signal value excludes numerical signal values that are perfect powers.

76. The article of claim 74, wherein the L-smooth integer signal value excludes numerical signal values that are less than 100.

77. The article of claim 66, wherein an enciphered message is to not include delimiter symbols.

78. The article of claim 66, wherein an enciphered message to be capable of being decrypted via use of a table look-up process after reception.

79. The article of claim 66, wherein the hierarchical symbol assignment system to comprise a matrix symbol assignment system.

80. The article of claim 66, wherein the numerical signal value to have an initial value, the to assign symbols to comprise to change the hierarchical symbol assignment system at least partially in response to a change of the numerical signal value, and the to encipher the message to include to encipher the message in accordance with multiple hierarchical symbol assignment systems.

81. The article of claim 80, wherein the initial value is to be communicated via a public/private key signal value enciphering protocol.

82. The article of claim 80, wherein the to change the numerical signal value to comprise to change the numerical signal value to be based, at least in part, on a pseudo-random process.

83. The article of claim 80, wherein the to change the numerical signal value to include to determine whether to change the numerical signal value and to determine a replacement numerical signal value.

84. The article of claim 66, wherein the to encipher to include to employ operations to permute at least portions of an enciphered message.

85. The article of claim 84, wherein the to employ operations to permute at least portions of the enciphered message to include to employ a cipher block chaining process.

86. The article of claim 84, wherein the to employ operations to permute at least portions of the enciphered message to include to employ two or more rounds of a Feistel pseudo-random process.

87. The article of claim 84, wherein the to employ operations to permute are to be based at least in part on an L-smooth numerical signal value to be represented as the binary digital signals.

88. The article of claim 66, wherein the computing platform is to further change an enciphering key signal value to change a level of security of enciphering.

89. The article of claim 88, wherein the computing platform is to perform the change of the enciphering key signal value to change the level of security of enciphering according to a predetermined protocol.

90. The article of claim 66, wherein the computing platform is to perform a change of an enciphering key signal value to change a level of security of enciphering is to be performed at least partially in response to transmission or receipt of a particular number of symbols or at certain intervals of time.

91. The article of claim 66, wherein the computing platform is to represent the hierarchical symbol assignment system as a string symbol assignment system.

92. The article of claim 91, wherein the computing platform is to represent the string symbol assignment system as the binary digital signals in which placement within a string representation is to determine, at least in part, the symbol assignment.

93. The article of claim 91, wherein the computing platform is to form the string symbol assignment system, at least in part, on a selection of portions to omit from the hierarchical symbol assignment system.

* * * * *